United States Patent
Matsuo (10) Patent No.: US 9,654,455 B2
(45) Date of Patent: May 16, 2017

(54) COMMUNICATION SYSTEM, COMMUNICATION DEVICE, KEY MANAGEMENT APPARATUS, AND COMMUNICATION METHOD

(71) Applicant: PANASONIC INTELLECTUAL PROPERTY MANAGEMENT CO., LTD., Osaka (JP)

(72) Inventor: Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 14/791,865

(22) Filed: Jul. 6, 2015

(65) Prior Publication Data
US 2016/0014100 A1    Jan. 14, 2016

(30) Foreign Application Priority Data
Jul. 10, 2014   (JP) ................................. 2014-142508

(51) Int. Cl.
*H04L 9/32*    (2006.01)
*H04L 29/06*   (2006.01)

(52) U.S. Cl.
CPC ........ *H04L 63/062* (2013.01); *H04L 63/0435* (2013.01); *H04L 63/08* (2013.01); *H04L 2463/062* (2013.01)

(58) Field of Classification Search
CPC ... H04L 63/062; H04L 63/0435; H04L 63/08; H04L 2463/062
(Continued)

(56) References Cited

U.S. PATENT DOCUMENTS 6,985,583 B1 *  1/2006  Brainard ................. G06F 21/31
                                                  380/277
7,096,354 B2 *  8/2006  Wheeler ............ G06Q 20/4014
                                                   705/64
(Continued)

FOREIGN PATENT DOCUMENTS

JP    2004-297755 A    10/2004
JP    2007-251348 A     9/2007
JP    2013-026840 A     2/2013

OTHER PUBLICATIONS

Shucheng Yu; Achieving Secure, Scalable, and Fine-grained Data Access Control in Cloud Computing; IEEE INFOCOM 2010; p. 1-9.*

(Continued)

*Primary Examiner* — Monjour Rahim
(74) *Attorney, Agent, or Firm* — Greenblum & Bernstein, P.L.C.

(57) ABSTRACT

A communication system includes a first communication device, a second communication device, and a key management apparatus. The second communication device generates a random number, generates encrypted data using an encryption key, encrypts the random number, generates key information data, and transmits the key information data, identification information of the second communication device, and the encrypted data to the first communication device. The first communication device receives the key information data, the identification information, and the encrypted data, transmits the key information data and the identification information to the key management apparatus, receives the encryption key from the key management device, decodes the encrypted data and obtains the predetermined data using the received encryption key. The key management apparatus receives the key information data and the identification information, decodes the key infor- (Continued)

mation data, acquires the random number, and transmits the encryption key to the first communication device.

7 Claims, 10 Drawing Sheets

(58) Field of Classification Search
USPC .......................................................... 713/169
See application file for complete search history.

(56) References Cited

U.S. PATENT DOCUMENTS

| | | | |
|---|---|---|---|
| 8,738,907 B2* | 5/2014 | French | H04L 63/062 |
| | | | 713/168 |
| 2007/0219911 A1 | 9/2007 | Abe | |
| 2009/0292918 A1* | 11/2009 | Mori | G06F 21/31 |
| | | | 713/168 |
| 2010/0306538 A1* | 12/2010 | Thomas | H04L 9/0844 |
| | | | 713/168 |

OTHER PUBLICATIONS

Neuman et al., "The Kerberos Network Authentication Service (V5)", Network Working Group, Request for Comments: 4120, Jul. 2005, pp. 1-138.

* cited by examiner

COMMUNICATION SYSTEM, COMMUNICATION DEVICE, KEY MANAGEMENT APPARATUS, AND COMMUNICATION METHOD

BACKGROUND OF THE INVENTION

1. Field of the Invention

The present invention relates to a communication system, a communication device, a key management apparatus, and a communication method.

2. Description of the Related Art

As an authentication scheme for performing authentication among multiple communication devices, there is a known authentication scheme that uses a key distribution center (KDC). Furthermore, Kerberos authentication is known that is an extended version of the authentication that uses the KDC (for example, refer to C. Neuman, T. Yu, S. Hartman, K. Raeburn "The Kerberos Network Authentication Service (V5)," Network Working Group, Request for Comments: 4120, July 2005).

SUMMARY OF THE INVENTION

The present invention is to provide a communication system, a communication device, a key management apparatus, and a communication method, in each of which cumbersomeness of processing by and processing load on the communication device to which data is provided is reduced and thus the data can be securely communicated.

According to an aspect of the present invention, there is provided a communication system including: a first communication device; a second communication device; and a key management apparatus, in which the second communication device includes a random number generation unit that generates a random number, a first encrypting processing unit that, using an encryption key that is based on the random number, encrypts predetermined data and thus generates encrypted data, and that, using a key of the second communication device, encrypts the random number and thus generates key information data, and a first communication unit that transmits the key information data, identification information of the second communication device, and the encrypted data to the first communication device, in which the first communication device includes a second communication unit that receives the key information data, the identification information of the second communication device, and the encrypted data from the second communication device, transmits the key information data and the identification information of the second communication device, which are received, to the key management apparatus, and receives the encrypted key from the key management apparatus, and a second decoding processing unit that, using the received encryption key, decodes the encrypted data and obtains the predetermined data, in which the key management apparatus includes a third communication unit that receives the key information data and the identification information of the second communication device from the first communication device, and a first decoding processing unit that decodes the key information data and thus acquires the random number, using a key of the second communication device, which corresponds to the identification information of the second communication device, and in which the third communication unit transmits the encrypted key that is based on the acquired random number, to the first communication device.

According to another aspect of the present invention, there is provided a communication device that provides predetermined data to a different communication device. The communication device includes: a random number generation unit that generates a random number; an encrypting processing unit that encrypts predetermined data and thus generates encryption data, using an encryption key that is based on the random number, and encrypts the random number and thus generates key information data using a key of the communication device, and a communication unit that transmits the key information data, identification information of the communication device, and the encrypted data to the different communication device.

According to still another aspect of the present invention, there is provided a communication device to which predetermined data from a different communication device is provided. The communication device includes: a communication unit that receives key information data that results from encrypting a random number using a key of the different communication device, identification information of the different communication device, and encrypted data that results from encrypting the predetermined data using an encryption key that is based on the random number, from the different communication device, transmits the received key information data and the identification information of the different communication device to the key management apparatus, and receives the encryption key from the key management apparatus; and a decoding processing unit that, using the received encryption key, decodes the encrypted data and obtains the predetermined data.

According to still another aspect of the present invention, there is provided a key management apparatus that is connected to a first communication device to which a second communication device provides predetermined data, through a network. The key management apparatus includes: a communication unit that receives key information data that results from encrypting a random number using a key of the second communication device, and identification information of the second communication device, from the first communication device; and a decoding processing unit that decodes the key information data and thus acquires the random number, using a key of the second communication device, which corresponds to the identification information of the second communication device in which the communication unit transmits an encryption key that is based on the acquired random number, to the first communication device.

According to still another aspect of the present invention, there is provided a communication method for use in a communication system that includes a first communication device, a second communication device, and a key management apparatus. The method includes: generating a random number in the second communication device; encrypting predetermined data and thus generating encrypted data using an encryption key that is based on the random number in the second communication device; encrypting the random number and thus generating key information data using a key of the second communication device in the second communication device; transmitting the key information data, identification information of the second communication device, and the encrypted data to the first communication device in the second communication device; receiving the key information data, the identification information of the second communication device, and the encrypted data from the second communication device in the first communication device; transmitting the key information data and the identification information of the second communication device to the key management apparatus in the first communication device; receiving the key information data and the identification information of the second communication device from the first communication device in the key management apparatus; decoding the key information data and thus acquiring the random number using a key of the second communication device, which corresponds to the identification information of the second communication device in the key management apparatus; transmitting an encryption key that is based on the acquired random number, to the first communication device in the key management apparatus; receiving the encryption key from the key management apparatus in the first communication device; and decoding the encrypted data and obtaining the predetermined data using the received encryption key in the first communication device.

According to the present invention, cumbersomeness of processing by and processing load on a communication device to which data is provided is reduced and thus the data can be securely communicated.

DETAILED DESCRIPTION OF THE PREFERRED EMBODIMENT

Figure 10:
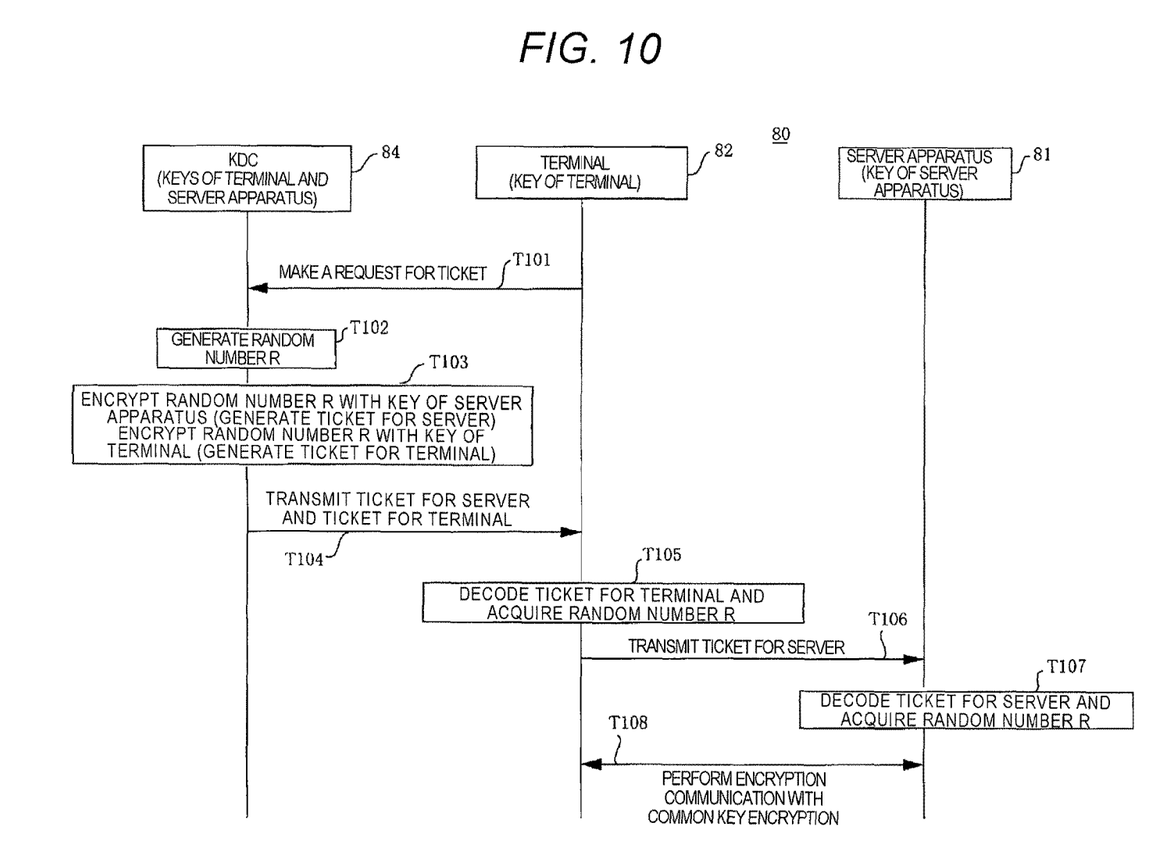
FIG. 10 is a sequence diagram illustrating a communication procedure in a case where communication is performed with a common key encryption scheme that uses a KDC.

FIG. 10 is a sequence diagram illustrating a communication procedure in a case where communication is performed with a common key encryption scheme using the KDC or Kerberos authentication described above. In FIG. 10, it is assumed that KDC 84, terminal 82, and server apparatus 81 are connected to communication system 80 through a network.

Server apparatus 81 provides a service (for example, content data). Terminal 82 is provided by server apparatus 81 with the service. KDC 84 generates tickets (a server ticket and a terminal ticket) for enabling server apparatus 81 and terminal 82 to communicate with each other, and issues the generated tickets to server apparatus 81 and terminal 82, respectively.

KDC 84 manages a common key (which is referred to as a key of server apparatus 81) that is shared between KDC 84 and server apparatus 81 and a common key (which is referred to as a key of terminal 82) that is shared between KDC 84 and terminal 82. Terminal 82 retains the common key (the key of terminal 82) that is shared between terminal 82 and KDC 84. Server apparatus 81 retains the common key (the key of server apparatus 81) that is shared between server apparatus 81 and KDC 84.

In a case of receiving an arbitrary service, terminal 82 makes a request to KDC 84 for the ticket over the network (T101). When receiving the request for the ticket, KDC 84 generates random number R (T102).

KDC 84 encrypts generated random number R with the key of server apparatus 81, and generates the server ticket (T103). KDC 84 encrypts generated random number R with the key of terminal 82, and generates the terminal key (T103). The ticket, for example, includes encrypted random number R, a time stamp indicating the date and time at which the ticket is generated, and information on the expiration date of the ticket.

KDC 84 transmits the server ticket and the terminal ticket to terminal 82 over the network (T104). Terminal 82 receives the terminal ticket from KDC 84, decodes the terminal ticket with the key of terminal 82, and acquires random number R (T105). Terminal 82 transmits the server ticket to server apparatus 81 through the network (T106).

Server apparatus 81 receives the server ticket from terminal 82, decodes the server ticket with the key of server apparatus 81, and acquires random number R (T107). Terminal 82 and server apparatus 81 communicate with each other with the common encryption key scheme through the network with random number R being the common key between terminal 82 and server apparatus 81 (T108).

In the communication procedure illustrated in FIG. 10, terminal 82 to which the service is provided requests KDC 84 to issue the ticket, transmits the acquired ticket to server apparatus 81, and performs encryption communication between terminal 82 and server apparatus 81.

To be more precise, in order to communicate with server apparatus 81, terminal 82 has to communicate with KDC 84 in advance. This means that when an owner of server apparatus 81 wants to hand over the content data within server apparatus 81 to an owner of terminal 82, the owner of terminal 82 has to communicate with KDC 84 in advance. The owner of server apparatus 81 experiences the inconvenience that he/she has to wait for the communication between terminal 82 and KDC 84 to be terminated.

Furthermore, in a case where a network environment between terminal 82 and KDC 84 is adverse and thus communication is impossible between terminal 82 and KDC 84, content data transfer itself is impossible. The cases where the network environment is adverse, for example, include a case where KDC 84 comes down by chance (stops operating), and a case where a state of wireless communication in a place where terminal 82 is arranged is adverse.

Furthermore, in the communication procedure illustrated in FIG. 10, in order to inform KDC 84 of a communication partner (server apparatus 81), terminal 82 has to acquire an ID of server apparatus 81 separately, and processing becomes cumbersome.

A communication system, a communication device, a key management apparatus, and a communication method will be described below in each of which cumbersomeness of processing by and processing load on the communication device to which data is provided is reduced and thus the data can be securely communicated.

An application of the communication system according to an embodiment, which is described below, for example, is a communication system that performs the encryption communication using the common key encryption scheme.

EMBODIMENTS

Figure 1:
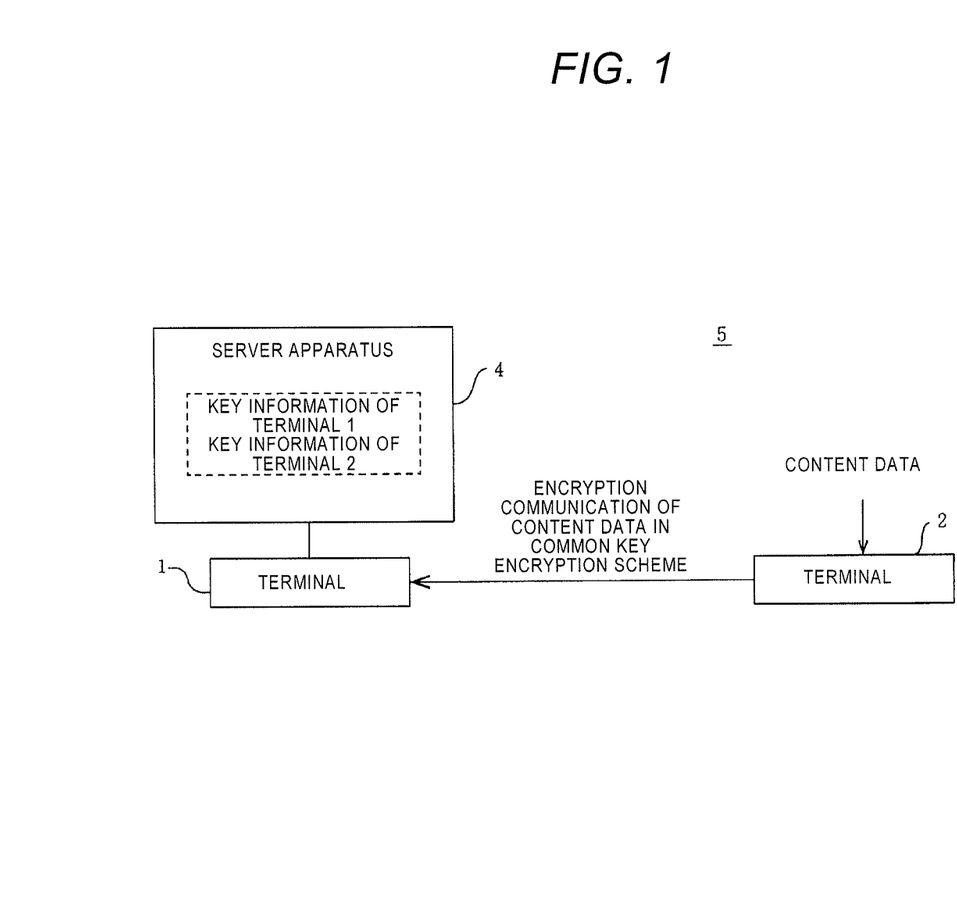
FIG. 1 is a block diagram illustrating a schematic configuration example of a communication system according to an embodiment.

FIG. 1 is a block diagram illustrating a schematic configuration example of communication system 5 according to the embodiment. Communication system 5 includes terminal 1 to which a service (for example, predetermined data (for example, content data)) is provided, terminal 2 that provides the service, and server apparatus 4. To be more precise, terminal 1 is one example of a service-provided terminal, and terminal 2 is one example of a service providing terminal.

Terminals 1 and 2, for example, are communication terminals (for example, smartphones) that are possessed by the users, respectively. Server apparatus 4 is a key issuing (key management) server, generates a key (for example, a session key) for performing communication between server apparatus 4 and terminals 1 and 2, and issues the generated key to terminals 1 and 2. Terminal 1 is one example of a first communication device. Terminal 2 is one example of a second communication device. Server apparatus 4 is one example of the key management apparatus.

Server apparatus 4 manages key information on a common key (which is referred to as a key of terminal N) that is shared between terminals N (terminal 1, 2, or so forth) and server apparatus 4.

Multiple terminals are present, and multiple common keys may be present. For example, server apparatus 4 manages keys of terminal 1 and terminal 2.

Terminal 2, for example, downloads content data from a broadcasting station or a content delivery server and retains the downloaded content data. Terminal 1, for example, receives encrypted content data that terminal 2 downloads, from terminal 2, and decodes the encrypted content data. The content delivery server is one example of a data providing server.

Figure 2:
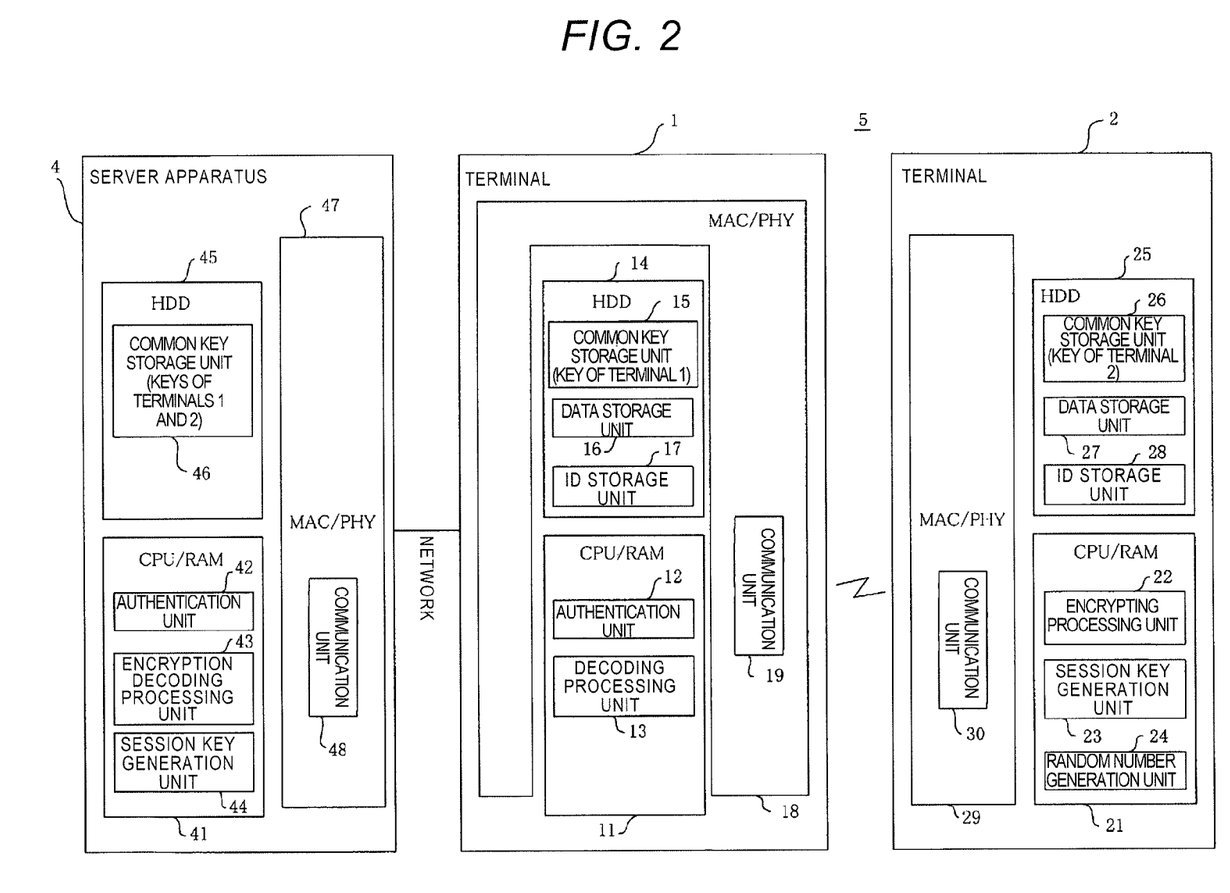
FIG. 2 is a block diagram illustrating a configuration example of the communication system according to the embodiment.

FIG. 2 is a block diagram illustrating a configuration example of communication system 5.

Terminal 1 is configured to include central processing unit (CPU)/random access memory (RAM) unit 11, hard disk drive (HDD) 14, and a media access control (MAC) layer and physical layer (PHY) unit 18.

CPU/RAM unit 11 controls operation of all of terminal 1 and functions as authentication unit 12 and decoding processing unit 13. Authentication unit 12 performs authentication-related processing with respect to server apparatus 4, for example, using a known authentication scheme. As an authentication method, for example, a known authentication scheme can be employed. Decoding processing unit 13 decodes data (for example, session key information data that is described below) that is encoded with the key of terminal 1 and data that is encoded with the key of terminal 2. The session key is a common key of terminals 1 and 2, which is used for communication through a session established between terminals 1 and 2, and is one example of an encryption key. Decoding processing unit 13 is one example of a second decoding processing unit.

Various pieces of information and various pieces of data are stored in HDD 14, and HDD 14 functions as common key storage unit 15, data storage unit 16, and ID storage unit 17. The key of terminal 1 is stored in common key storage unit 15. Various pieces of data (for example, content data) are stored in data storage unit 16. An ID of terminal 1 (one example of identification information) is stored in ID storage unit 17. The ID, for example, includes a media access control address (a MAC address).

MAC/PHY unit 18 controls the communication between terminal 2 and server apparatus 4, and functions as communication unit 19. Communication unit 19, for example, performs the communication between terminal 2 and server apparatus 4. Communication unit 19, for example, performs short-distance wireless communication (for example, Bluetooth (a registered trademark), or Felica (a registered trademark)) or communication through a network such as the Internet, between communication unit 19 and terminal 2. Communication unit 19 performs the communication through the network such as the Internet between communication unit 19 and server apparatus 4. Communication unit 19 is one example of a second communication unit.

Terminal 2 is configured to include CPU/RAM unit 21, HDD 25, and MAC/PHY unit 29.

CPU/RAM unit 21 controls operation of all of terminal 2, and functions as encrypting processing unit 22, session key generation unit 23, and random number generation unit 24. Random number generation unit 24 generates random number R.

Session key generation unit 23 generates the session key. Session key generation unit 23, for example, calculates hash value Hash (R) using a unidirectional function (for example, a hash function) from random number R, and generates hash value Hash (R) as the session key. Session key generation unit 23 is one example of a first key generation unit.

Encrypting processing unit 22, for example, encrypts data (for example, random number R) with the key of terminal 2. Encrypting processing unit 22, for example, encrypts data (for example, content data) with the session key. Encrypting processing unit 22 is one example of a first encrypting processing unit.

Various pieces of information and various pieces of data are stored in HDD 25, and HDD 25 functions as common key storage unit 26, data storage unit 27, and ID storage unit 28. For example, the key of terminal 2 is stored in common key storage unit 26. Various pieces of data (for example, content data) are stored in data storage unit 27. An ID of terminal 2 (for example, a MAC address) is stored in ID storage unit 28.

MAC/PHY unit 29 controls communication between MAC/PHY unit 29 and terminal 1 and functions as communication unit 30. The communication unit 30 performs short-distance wireless communication (for example, Bluetooth (a registered trademark), or Felica (a registered trademark)) or communication through a network such as the Internet. Communication unit 30 is one example of a first communication unit.

Server apparatus 4 is configured to include CPU/RAM unit 41, HDD 45, and MAC/PHY unit 47.

CPU/RAM unit 41 controls operation of all of server apparatus 4, and includes authentication unit 42, encryption decoding processing unit 43, and session key generation unit 44. Authentication unit 42 performs authentication-related processing with respect to terminal 1, for example, using a known authentication scheme.

Session key generation unit 44 generates the session key. Session key generation unit 44, for example, calculates hash value Hash (R) using a unidirectional function (for example, the hash function) from random number R, and generates hash value Hash (R) as the session key. Session key generation unit 44 is one example of a second key generation unit.

Encryption decoding processing unit 43, for example, decodes data (for example, key information data that is described below) with the key of terminal 2. Encryption decoding processing unit 43, for example, encrypts data (for example, the session key) with the key of terminal 1. Encryption decoding processing unit 43 is one example of a first decoding processing unit, and is one example of a second encrypting processing unit.

Various pieces of information and various pieces of data are stored in HDD 45, and HDD 45 functions as common key storage unit 46. For example, the key of terminal N (for example, terminal 1 or 2), and association information for associating a key of terminal N and an ID of terminal N with each other are stored in common key storage unit 46. The key of terminal N has a value that is calculated from the ID of terminal N, and for example, has a value that is calculated from the ID of terminal N or a value associated with the ID of terminal N.

MAC/PHY unit 47 controls communication between MAC/PHY unit and terminal 1 and functions as communication unit 48. Communication unit 48 communicates with terminal 1 through the network such as the Internet. Communication unit 48 is one example of a third communication unit.

Figure 3A:
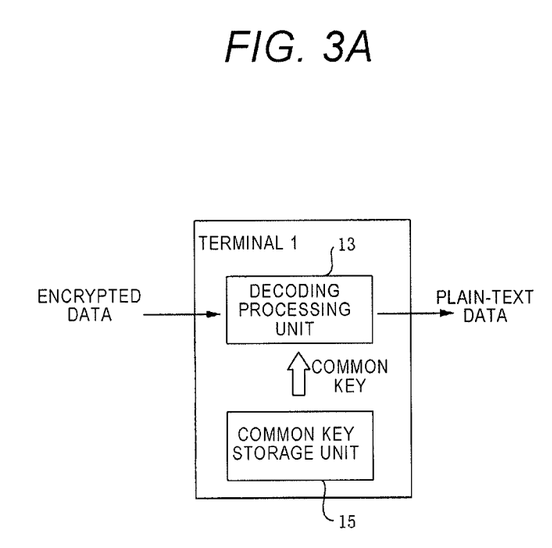
FIG. 3A is a schematic diagram for describing one decoding example in which a common key is used by a service-provided terminal according to the embodiment.
Figure 3B:
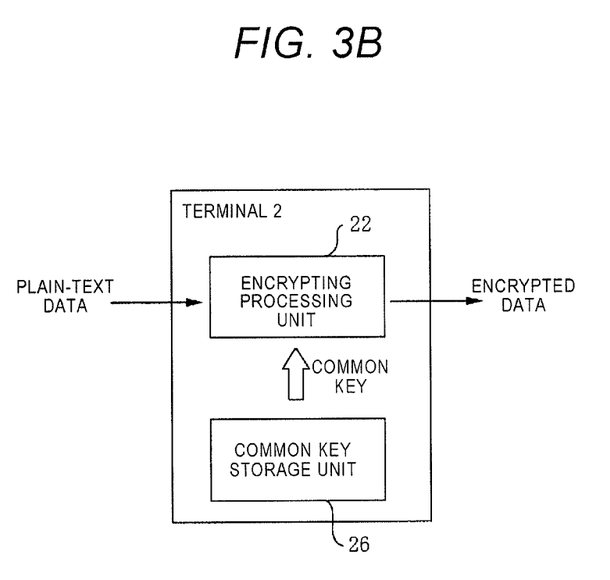
FIG. 3B is a schematic diagram for describing one encryption example in which the common key is used by a service providing terminal according to the embodiment.

FIG. 3A is a schematic diagram for describing one example of decoding in which the common key is used by terminal 1. FIG. 3B is a schematic diagram for describing one example of encryption in which the common key is used by terminal 2.

In FIG. 3A, decoding processing unit 13 of terminal 1, for example, decodes encrypted data, which is input, with the common key (for example, the key of terminal 1) stored in common key storage unit 15, and converts a result of the decoding into plain-text data.

In FIG. 3B, encrypting processing unit 22 of terminal 2, for example, encrypts plain-text data, which is input, with the common key (for example, the key of terminal 2) stored in common key storage unit 26.

As a cryptographic algorithm for encrypting data with the common key, for example, encryption schemes such as advanced encryption standard (AES) and data encryption standard (DES) are used.

Next, an operational example of communication system 5 is described.

Figure 4:
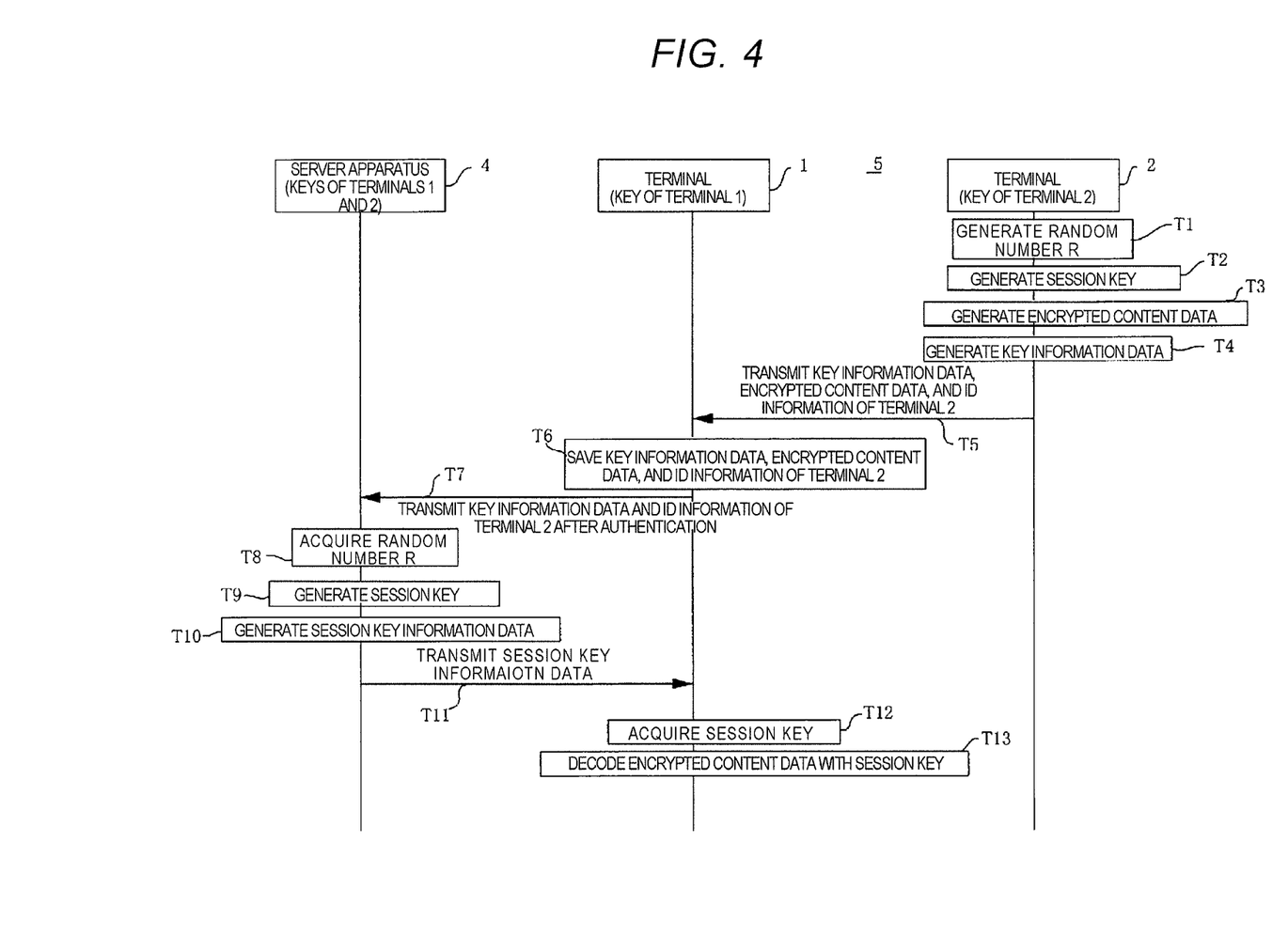
FIG. 4 is a sequence diagram illustrating an operational example in the communication system according to the embodiment.
Figure 5:
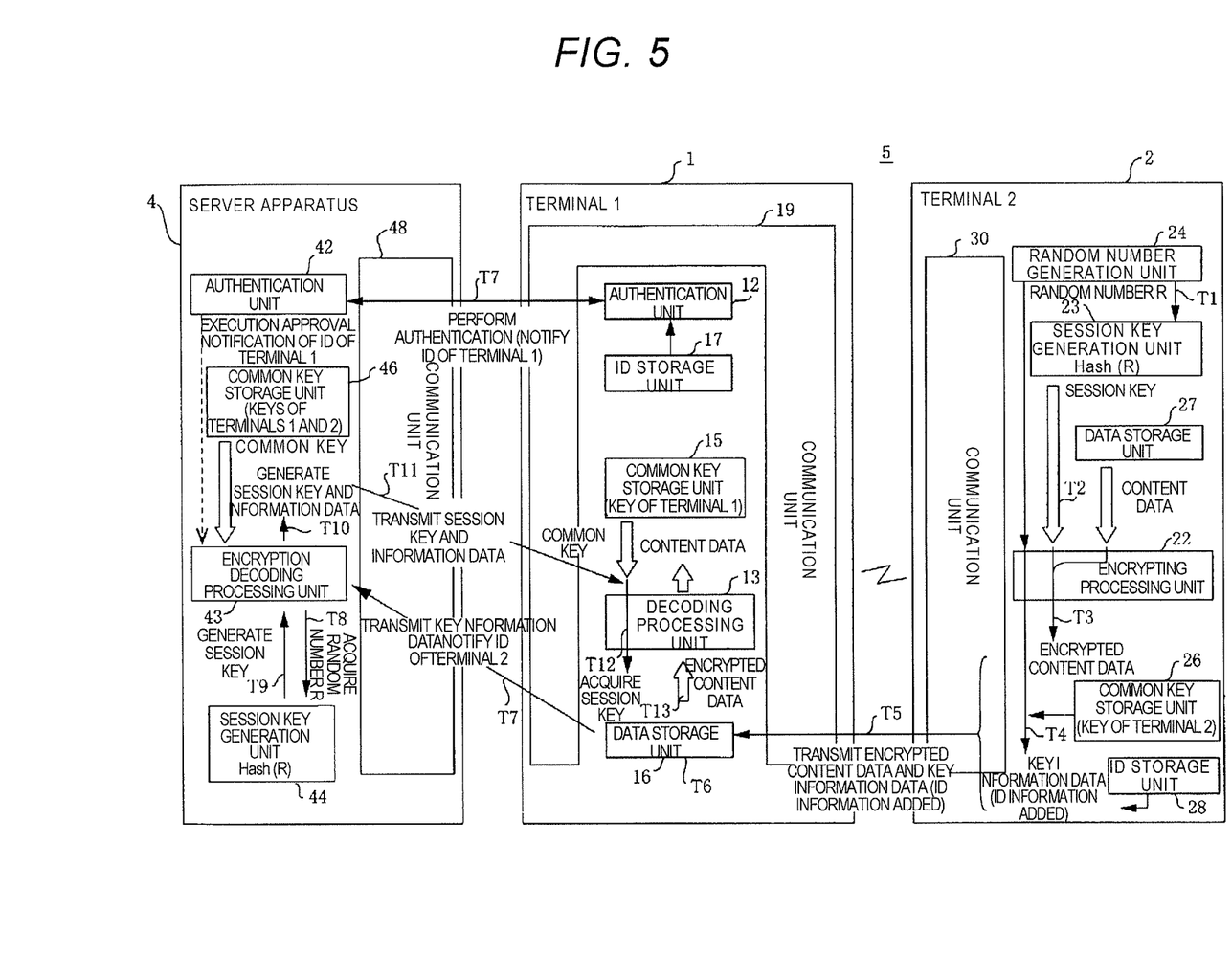
FIG. 5 is a schematic diagram for describing a flow in the operational example illustrated in FIG. 4 using a configuration of the communication system.

FIG. 4 is a sequence diagram illustrating the operational example of communication system 5. FIG. 5 is a schematic diagram for describing a flow in the operational example illustrated in FIG. 4 using a configuration of communication system 5. In FIGS. 4 and 5, it is assumed that terminal 2 provides content data to terminal 1.

First, in terminal 2, random number generation unit 24 generates random number R (T1). Session key generation unit 23 calculates hash value Hash (R) from random number R using the hash function, and generates hash value Hash (R) as the session key (T2).

Encrypting processing unit 22 encrypts the content data stored in data storage unit 27 using the generated session key, and generates encrypted content data (T3). Encrypting processing unit 22 encrypts random number R using the key of terminal 2 stored in common key storage unit 26, and generates the key information data (T4).

Communication unit 30 transmits the generated key information data, the encrypted content data, and the ID of terminal 2 stored in ID storage unit 28 to terminal 1 (T5). The ID of terminal 2 may be added to the key information data.

In terminal 1, communication unit 19 receives the encrypted content data from terminal 2, the key information data, the ID of terminal 2, and stores (saves) the encrypted content data, the key information data, and the ID of terminal 2 in data storage unit 16 (T6).

Authentication unit 12 notifies server apparatus 4 of the ID of terminal 1, which is stored in ID storage unit 17, and executes authentication on the side to which authentication is applied (terminal authentication) (T7). In a case where terminal 1 is a terminal that is authenticated, as being legitimate, by authentication unit 12 and authentication unit 42 of server apparatus 4, communication unit 19 transmits the key information data stored in data storage unit 16 and the ID of terminal 2 to server apparatus 4 (T7). In a case where the authentication fails, terminal 1 terminates the present operation without sending the data to server apparatus 4.

In server apparatus 4, communication unit 48 receives the key information data and the ID of terminal 2 from terminal 1. Encryption decoding processing unit 43 decodes the key information data with the key of terminal 2 associated with the ID of terminal 2, which is stored in common key storage unit 46 and is received, and acquires random number R (T8).

Session key generation unit 44 calculates hash value Hash (R) from the acquired random number R using the hash function, and generates hash value Hash (R) as the session key (T9).

Encryption decoding processing unit 43 stores the session key in common key storage unit 46, and encrypts the session key with the key of terminal 1 associated with the ID of terminal 1, which is notified from terminal 1, thereby generating the session key information data (T10). Communication unit 48 transmits the session key information data to terminal 1 (T11). The session key generated by server apparatus 4 is equivalent to a ticket in Kerberos authentication.

In terminal 1, when communication unit 19 receives the session key information data from server apparatus 4, decoding processing unit 13 decodes the session key information data with the key of terminal 1, which is stored in common key storage unit 15, and obtains the session key (T12).

Decoding processing unit 13 decodes the encrypted content data, which is stored in data storage unit 16, with the session key (T13). The decoded content data, for example, is stored in data storage unit 16, or is suitably processed by a content processing unit (not illustrated).

In the operational example in FIGS. 4 and 5, terminal 1 can acquire the encrypted content data from terminal 2 without communicating with server apparatus 4. Therefore, in a case where the content data within terminal 2 is handed over to an owner of terminal 1, an owner of terminal 2 does not need to wait for the communication between terminal 1 and server apparatus 4 to be terminated, and this improves the convenience.

Furthermore, even if a network environment between terminal 1 and server apparatus 4 is adverse and thus communication is impossible between terminal 1 and server apparatus 4, encrypted content data transfer itself is possible. Cases where the network environment is adverse, for example, include a case where server apparatus 4 comes down by chance (stops operating), and a case where a state of wireless communication in a place where terminal 1 is arranged is adverse.

Furthermore, in operational examples in FIGS. 4 and 5, because the ID of terminal 2 is also acquired at the point in time when the encrypted content data is acquired, terminal 1 does not need to perform cumbersome processing in order to inform server apparatus 4 of a communication partner (terminal 2) that acquires the encrypted content data.

Furthermore, terminal 1 acquires the key information data (random number R encrypted with the key of terminal 2) from terminal 2 (T5), and acquires session key (Hash (R)) by decoding processing (T12). In this case, for example, when the session key is set to be random number R, not Hash (R), because in terminal 1, random number R and random number R encrypted with the key of terminal 2 are available, there is a concern that the key information on terminal 2 will be revealed by a chosen plain text attack. However, at this point, because the session key is not random number R as is and is set to be Hash (R), security is ensured without the chosen plain text attack being achieved.

Further, in a case where terminal authentication is executed, because server apparatus 4 can strictly determine a transmission destination of the session key, the security can be further improved.

Furthermore, even if the security of a channel between terminal 1 and server apparatus 4 is low, the session key can be communicated with enhanced security by the session key generated by server apparatus 4 being communicated in an encrypted state. Therefore, terminals 1 and 2 can perform data communication using a high-security session key.

Step T4 may be executed before step T2.

Between step T6 and step T7, a suitable time difference (time lag) may be present. To be more precise, the time difference may be present between acquisition of the encrypted content data and acquisition of the session key information data from server apparatus 4, and terminal 1 can select an arbitrary timing. Furthermore, processing for the terminal authentication in T7 may be omitted.

Figure 6:
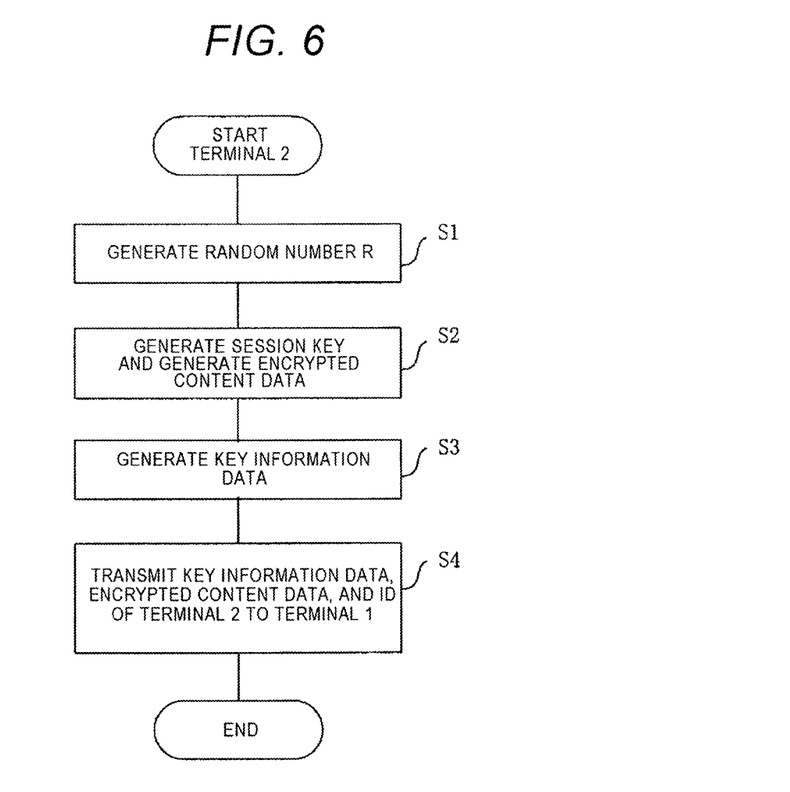
FIG. 6 is a flowchart illustrating one example of an operational procedure that is performed by a service providing terminal according to the embodiment.

FIG. 6 is a flowchart illustrating one example of an operational procedure that is performed by terminal 2 (one example of the service providing terminal).

First, random number generation unit 24 generates random number R (S1). Session key generation unit 23 calculates hash value Hash (R) from random number R using the hash function, and generates hash value Hash (R) as the session key. The generated session key, for example, is stored in common key storage unit 26. Encrypting processing unit 22 encrypts the content data stored in data storage unit 27 using the generated session key, and generates the encrypted content data (S2).

Encrypting processing unit 22 encrypts the generated random number R with the key of terminal 2 stored in common key storage unit 26, and generates the key information data (S3). Communication unit 30 transmits the generated key information data, the encrypted content data, and the ID of terminal 2 stored in ID storage unit 28 to terminal 1 (S4). Thereafter, terminal 2 terminates the present operation.

In an operational example of terminal 2, terminal 2 can transmit the encrypted data to terminal 1 without being aware of server apparatus 4. Terminal 1 accesses server apparatus 4 and acquires the session key, and thus can decode the encrypted content data at any time.

Figure 7:
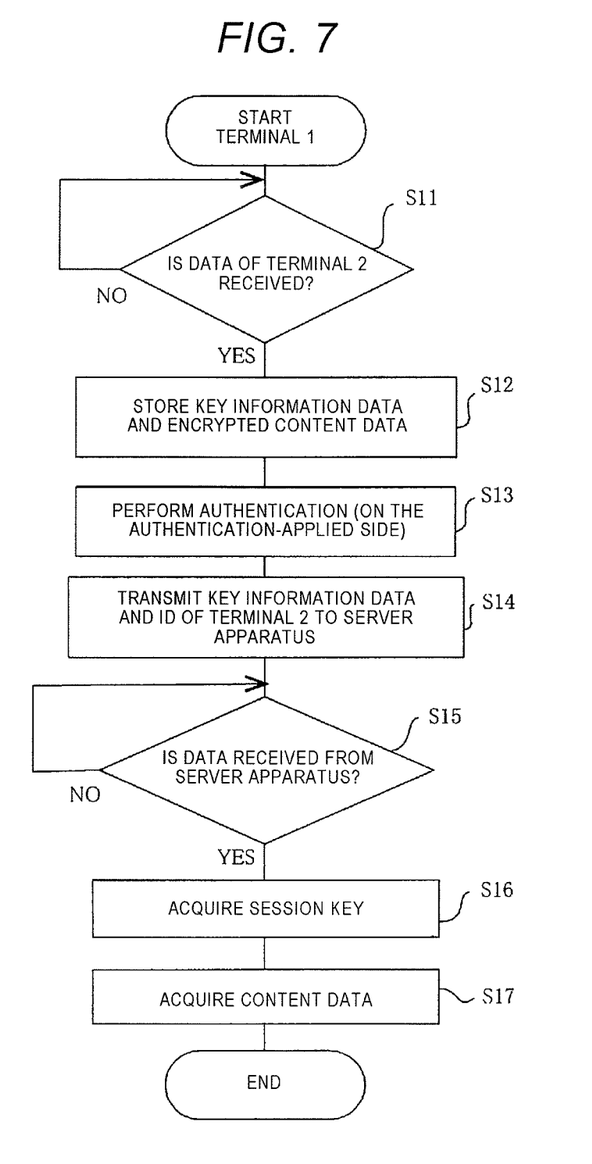
FIG. 7 is a flowchart illustrating one example of an operational procedure that is performed by a service-provided terminal according to the embodiment.

FIG. 7 is a flowchart illustrating one example of an operational procedure that is performed by terminal 1 (one example of the service-provided terminal).

Furthermore, communication unit 19 waits until data transmitted from terminal 2 is received (S11). The received data includes the encrypted content data, the key information data, and the ID of terminal 2.

When the data is received from terminal 2, communication unit 19 stores (saves) the key information data and the encrypted content data in data storage unit 16 (S12).

Authentication unit 12 notifies server apparatus 4 of the ID of terminal 1, which is stored in ID storage unit 17, and as the authentication-applied side, executes authentication (S13). In the case where terminal 1 is a terminal that is authenticated, as being legitimate, (that is successfully authenticated) by authentication unit 12 and authentication unit 42 of server apparatus 4, communication unit 19 transmits the key information data stored in data storage unit 16 and the ID of terminal 2 to server apparatus 4 (S14). In a case where the authentication fails, terminal 1 terminates the present operation.

Communication unit 19 waits until the session key information data is received from server apparatus 4 (S15). When communication unit 19 receives the session key information data, decoding processing unit 13 decodes the session key information data with the key of terminal 1 stored in common key storage unit 15, and obtains the session key (S16). Decoding processing unit 13 decodes the encrypted content data stored in data storage unit 16 with the obtained session key, and acquires the content data (S17). Thereafter, terminal 1 terminates the present operation.

In an operational example of terminal 1, because terminal 1 can acquire the encrypted content data from terminal 2 without communication with server apparatus 4, in a case where the content data within terminal 2 is handed over to the owner of terminal 1, an owner of terminal 2 does not need to wait until terminal 1 and server apparatus 4 terminate communication, thereby improving the convenience.

Furthermore, even if the network environment between terminal 1 and server apparatus 4 is adverse and thus the communication is impossible between terminal 1 and server apparatus 4, the encrypted content data transfer is possible. Cases where the network environment is adverse, for example, include a case where server apparatus 4 comes down by chance (stops operating), and a case where a state of wireless communication in a place where terminal 1 is arranged is adverse.

Furthermore, in an operational example in FIG. 7, because the ID of terminal 2 is also acquired at the point in time when the encrypted content data is acquired, terminal 1 does not need to perform cumbersome processing in order to inform server apparatus 4 of a communication partner (terminal 2) that acquires the encrypted content data.

Figure 8:
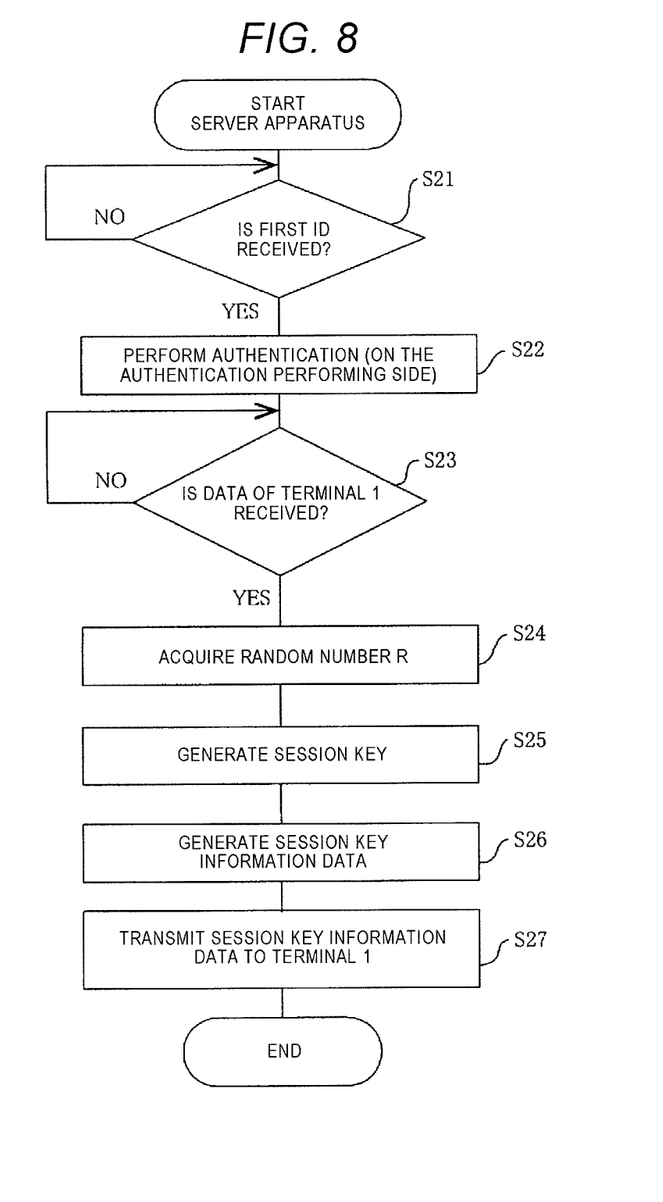
FIG. 8 is a flowchart illustrating one example of an operational procedure that is performed by a server apparatus according to the embodiment.

FIG. 8 is a flowchart illustrating one example of an operational procedure that is performed by server apparatus 4.

First, communication unit 48 waits until the ID of terminal 1 is notified from terminal 1 (S21). When the ID of terminal 1 is notified, authentication unit 42 performs authentication as the authentication performing side (S22). In a case where terminal 1 is a terminal that is authenticated, as being legitimate, (that is successfully authenticated) by authentication unit 42 and authentication unit 12 of terminal 1, communication unit 48 waits until data is received from terminal 1 (S23). The received data includes the key information data and the ID of terminal 2. In a case where the authentication fails, server apparatus 4 terminates the present operation.

When communication unit 48 receives the data from terminal 1, encryption decoding processing unit 43 reads the key of terminal 2 associated with the ID of terminal 2, which is stored in common key storage unit 46 and is received. Encryption decoding processing unit 43 decodes the key information data with a key of terminal 2, which is read, and acquires random number R (S24).

Session key generation unit 44 calculates hash value Hash (R) from the acquired random number R using the hash function, and generates hash value Hash (R) as the session key (S25).

Encryption decoding processing unit 43 reads the key of terminal 1 associated with the ID of terminal 1, which is stored in common key storage unit 46 and is notified. Encryption decoding processing unit 43 encrypts the generated session key with the key of terminal 1, which is read, and generates the session key information data (S26). Communication unit 48 transmits the generated session key information data to terminal 1 (S27). Thereafter, server apparatus 4 terminates the present operation.

In an operational example of server apparatus 4, because server apparatus 4 hands over Hash (R), not random number R to terminal 1, as the session key, the security is ensured without a chosen plain text attack being achieved in terminal 1. Furthermore, because server apparatus 4 does not communicate directly with terminal 2, the processing load on server apparatus 4 can be reduced.

With communication system 5, even if an apparatus that provides a service is terminal 2, not a server apparatus, terminal 1 can be provided with the service (various pieces of data) with machine to machine communication (M2M). Furthermore, even if communication is performed between terminals, the cumbersomeness of processing by and processing load on terminal 1 to which data is provided is reduced and thus the data can be securely communicated.

Furthermore, in a case where the data communication is performed using the KDC or Kerberos authentication, there is a need for the service-provided apparatus (for example, a personal computer (PC)) to retain an ID of or identification information of a service providing apparatus (for example, a printer) and to designate a service providing apparatus as an access target through an operation unit and the like.

In contrast, with communication system 5, terminal 1, as the service-provided terminal, is notified by terminal 2 of the ID or the identification information without the need to retain the ID of terminal 2 as the service providing terminal or the identification information in advance. Therefore, the storage capacity of terminal 1 can be reduced. Particularly, this is advantageous in a case where multiple terminals 2 provide terminal 1 with content data.

Furthermore, because terminal 1 does not need to transmit the data to terminal 2, the processing by terminal 1 can be simplified and the processing load on terminal 1 can be reduced.

Furthermore, because the content data and the like can be transmitted and received in terminals, for example, a content server that delivers the content data does not need to deliver the content data to each of the terminals. For example, the content server can deliver the content data and the like to a small number of terminals 2, and terminal 2 can transfer the content data and the like to one or more terminals 1. Accordingly, the processing load on a service providing server such as the content server can be reduced, and an amount of traffic on a public network such as the Internet can be reduced.

Furthermore, because the encryption communication is performed between terminal 1 and terminal 2 and between terminal 1 and server apparatus 4, terminal 1 connects to various terminals 2 and performs control such that there is less deterioration in security, and thus can be provided with the content data. Therefore, the data communication between normal terminals 1 and 2 can be guaranteed.

Furthermore, even in a case where terminal 2 does not connect to the Internet and the like, for example, terminal 2 can simply transmit encrypted data to terminal 1 with short-distance wireless communication. For example, even in a case where a user of terminal 1 visits a house of a user of terminal 2 and desires to acquire the content data that is retained in terminal 2, the likelihood that information will be leaked from a communication environment of terminal 2 can be lowered without the need for terminal 1 to use the communication environment of the house of the user of terminal 2.

Modification Examples

FIG. 4 illustrates that server apparatus 4 encrypts the session key with the key of terminal 1 and then transmits the session key information data to terminal 1. A modification example illustrates that server apparatus 4 transmits the session key to terminal 1 over a secure channel without encrypting the session key.

Figure 9:
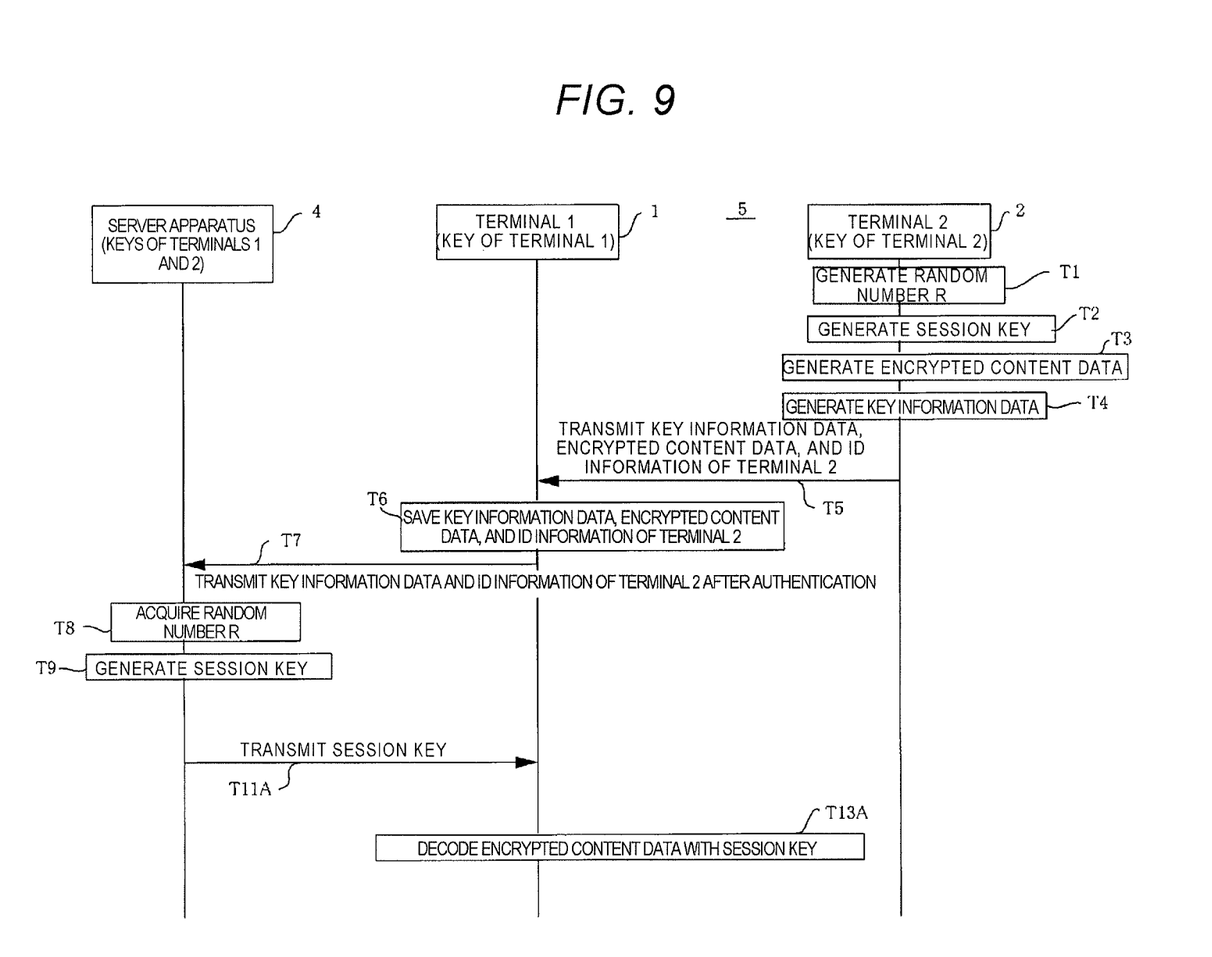
FIG. 9 is a sequence diagram illustrating an example of operation by the communication system in a modification example.

FIG. 9 is a sequence diagram illustrating a modification example of operation of communication system 5. In FIG. 9, the same steps as in FIG. 4 are given the same reference numerals and thus descriptions thereof are omitted or simplified.

In step T9, session key generation unit 44 calculates hash value Hash (R) from random number R using the hash function, and generates the session key. Communication unit 48 transmits the generated session key to terminal 1 over a secure channel formed between server apparatus 4 and terminal 1 without encrypting the generated session key (T11A). Secure channels, for example, include a channel that is used in a secure socket layer (SSL).

In terminal 1, communication unit 19 receives the session key from server apparatus 4 over the secure channel. Decoding processing unit 13 decodes the encrypted content data stored in data storage unit 16 with the received session key (T13A).

In an operational example in FIG. 9, encrypting processing of the session key by server apparatus 4 and decoding processing of the session key information data by terminal 1 can be omitted and security is achieved. Furthermore, with the use of an SSL accelerator, the processing load on server apparatus 4 and on terminal 1 can be reduced, and the time necessary for terminal 2 to provide a service to terminal 1 can be shortened.

Various embodiments are described above referring to the drawings, but it goes without saying that the present invention is not limited to such examples. It is apparent to a person of ordinary skill that various modification examples or revised examples can be contemplated within the scope of claims, and it is understood that these also justifiably fall into the technical scope of the present invention.

According to the embodiments described above, the communication device to which the service is provided is illustrated as a terminal that the user possesses, but may be a server apparatus that manages various pieces of information.

According to the embodiments described above, session key generation units 23 and 44 are illustrated as generating hash value Hash (R) from random number R using the hash function as a session key, but may generate a different session key.

For example, session key generation units 23 and 44 may encrypt random number R in accordance with the common encryption key scheme (for example, an AES) using the keys of devices (terminal 2 and server apparatus 4) to which session key generation unit 23 and 44 belong, respectively, and may set the encrypted key as a session key.

For example, session key generation units 23 and 44 may encrypt random number R in accordance with a public encryption key scheme (for example, an RSA) using the keys of devices (terminal 2 and server apparatus 4) to which session key generation unit 23 and 44 belong, respectively, and may set the encrypted key as a session key.

According to the embodiments described above, known data (for example, an ID of a device that generates a random number) may be included in one portion of random number R. In this case, reliability of random number R that is generated can be further improved.

According to the embodiments described above, it is illustrated that in most cases, the session key is hash value Hash (R), but the session key may be random number R itself.

According to the embodiments described above, it is illustrated that in most cases, a HDD is used as a storage medium, but a storage medium other than a HDD may be used.

The present invention is useful in a communication system, a communication device, a key management apparatus, and a communication method in each of which cumbersomeness of processing by and processing load on the communication device to which data is provided is reduced and thus the data can be securely communicated.

What is claimed is:

1. A communication system, comprising:
   a first communication device;
   a second communication device; and
   a key management apparatus,
   wherein the second communication device includes
      a random number generator that generates a random number,
      a first encrypting processor that, using an encryption key that is based on the random number, encrypts predetermined data and thus generates encrypted data, and that, using a key of the second communication device, encrypts the random number and thus generates key information data, and
      a first communicator that transmits the key information data, identification information of the second communication device, and the encrypted data to the first communication device,
   wherein the first communication device includes
      a second communicator that receives the key information data, the identification information of the second communication device, and the encrypted data from the second communication device, transmits the key information data and the identification information of the second communication device, which are received, to the key management apparatus, and receives the encrypted key from the key management apparatus, and
      a second decoding processor that, using the received encryption key, decodes the encrypted data and obtains the predetermined data,
   wherein the key management apparatus includes
      a third communicator that receives the key information data and the identification information of the second communication device from the first communication device, and
      a first decoding processor that decodes the key information data and thus acquires the random number, using a key of the second communication device, which corresponds to the identification information of the second communication device, and
   wherein the third communicator transmits the encrypted key that is based on the acquired random number, to the first communication device.

2. The communication system of claim 1,
   wherein the second communication device includes a first key generator that generates the encryption key from the random number using a unidirectional function, and
   wherein the key management apparatus includes a second key generator that generates the encryption key from the random number using the unidirectional function.

3. The communication system of claim 1,
   wherein the key management device includes a second encrypting processor that encrypts the encryption key with a key of the first communication device,
   wherein the third communicator transmits the encrypted encryption key to the first communication device,
   wherein the second communicator receives the encrypted encryption key from the key management apparatus, and
   wherein the second decoding processor decodes the received encryption key with the key of the first communication device and decodes the encrypted data using the decoded encryption key.

4. The communication system of claim 1,
   wherein the first communicator and the second communicator mutually perform short-distance wireless communication.

5. The communication system of claim 1,
   wherein the second communicator transmits identification information of the first communication device to the key management apparatus, and
   wherein the key management apparatus includes an authenticator that authenticates the first communication device using the identification information of the first communication device.

6. The communication system of claim 1,
   wherein the first communication device and the second communication device are communication terminals, and
   wherein the second communication device includes a data acquirer that acquires the predetermined data from a data providing server.

7. A communication method for use in a communication system that includes a first communication device, a second communication device, and a key management apparatus, the method comprising:
   generating a random number in the second communication device;
   encrypting predetermined data and thus generating encrypted data using an encryption key that is based on the random number in the second communication device;

encrypting the random number and thus generating key information data using a key of the second communication device in the second communication device;

transmitting the key information data, identification information of the second communication device, and the encrypted data to the first communication device in the second communication device;

receiving the key information data, the identification information of the second communication device, and the encrypted data from the second communication device in the first communication device;

transmitting the key information data and the identification information of the second communication device to the key management apparatus in the first communication device;

receiving the key information data and the identification information of the second communication device from the first communication device in the key management apparatus;

decoding the key information data and thus acquiring the random number using a key of the second communication device, which corresponds to the identification information of the second communication device in the key management apparatus;

transmitting an encryption key that is based on the acquired random number, to the first communication device in the key management apparatus;

receiving the encryption key from the key management apparatus in the first communication device; and decoding the encrypted data and obtaining the predetermined data using the received encryption key in the first communication device.

* * * * *